United States Patent [19]
Kinstler

[11] Patent Number: 5,933,263
[45] Date of Patent: Aug. 3, 1999

[54] SELF-POWERED DATALINK ACTIVATION SYSTEM

[75] Inventor: Gary A. Kinstler, Torrance, Calif.

[73] Assignee: The Boeing Company, Seal Beach, Calif.

[21] Appl. No.: 08/801,075

[22] Filed: Feb. 14, 1997

[51] Int. Cl.$^6$ .................................................. H04B 10/00
[52] U.S. Cl. .......................... 359/142; 359/143; 359/144; 359/147; 359/172; 102/207
[58] Field of Search .................................. 359/142, 143, 359/144, 147, 172; 102/207, 201

[56] References Cited

U.S. PATENT DOCUMENTS

| | | | |
|---|---|---|---|
| 3,228,337 | 1/1966 | Grantham et al. | 102/70.2 |
| 4,091,734 | 5/1978 | Redmond et al. | 102/70.2 |
| 4,479,264 | 10/1984 | Lockett et al. | 455/605 |
| 4,697,764 | 10/1987 | Hardy et al. | 244/137.4 |
| 4,870,902 | 10/1989 | Simon et al. | 102/201 |
| 4,897,884 | 1/1990 | Heller | 455/603 |
| 4,905,309 | 2/1990 | Maisonneuve et al. | 455/603 |
| 4,912,522 | 3/1990 | Oates et al. | 455/603 |
| 5,005,211 | 4/1991 | Yuhasz | 455/603 |
| 5,276,336 | 1/1994 | Winterhalter | 250/551 |
| 5,654,813 | 8/1997 | Whitworth | 359/147 |
| 5,760,558 | 6/1998 | Popat | 318/480 |

*Primary Examiner*—Leslie Pascal
*Attorney, Agent, or Firm*—Lawrence N. Ginsberg

[57] ABSTRACT

The system includes at least one data receiver, a low-power, photovoltaic power generation and distribution system, and a unique signal detector. The data receiver receives serial digital information from a remote optical data transmitter. The data receiver serves both activation and data/control wireless datalink functions. The low-power photovoltaic power generation and distribution system includes at least one photovoltaic panel for receiving optical power from a directed beam remote optical emission source. The power generation and distribution system also includes a power accumulation and distribution portion connected to the photovoltaic panel for accumulating power generated by the photovoltaic panel for periodically and intermittently distributing accumulated power in desired quantities. The unique signal detector is connected to the data receiver and to the power accumulation and distribution portion. It is also connectable to an electrical apparatus. The periodically and intermittently distributed power enables the unique signal detector to evaluate incoming data received from the data receiver, and upon detection of the receipt of the signal qualifying as a key, thereupon issues a command to the electrical apparatus to initiate uninterrupted data communication from the data receiver.

15 Claims, 6 Drawing Sheets

SELF-POWERED DATALINK ACTIVATION SYSTEM

BACKGROUND OF THE INVENTION

1. Field of the Invention

The present invention pertains to a wireless system for remotely activating a data link to remote devices in a self-powered fashion. In a primary embodiment, the invention is directed for use with an armament system with a plurality of munitions which require pre-conditioning initialization prior to launch, but which have no direct wire umbilical connection to the host platform. The invention is also generally applicable to any situation where it is desired to activate a data link to remote devices without requiring the use of any standby power source within the remote devices while simultaneously not requiring any physical connection to the remote devices.

2. Description of the Related Art

Today's weapons systems increasingly rely on the use of precision guided munitions (PGM's) to improve the accuracy with which ordnance may be delivered to a target, thereby increasing the damage expectancy for each weapon, and reducing the number of weapons and delivery platforms which must be utilized to achieve the desired level of damage. Reducing the number of weapons and sorties which must be committed to achieve a desired damage expectancy result minimizes crew exposure to enemy defenses and offers the potential for substantially reduced munitions and operations costs.

Today's PGM's require varying degrees of prelaunch preparation, or initialization, to enable and prepare the PGM's guidance system, and control targeting and launch sequencing. This is generally accomplished with a data link between the host platform and the munitions, most commonly over a hardwire umbilical between the host platform and the PGM. A hardwire connection affords the ability to uniquely and individually communicate between the host platform and each munition and provide a source of power to sustain the communication process.

Recent innovations to reduce the cost of upgrading host platforms to interface with PGM's have resulted in the elimination of the hardwire umbilical to PGM's, using instead a wireless interface and self-contained munitions power. Current implementations of the wireless interface require that the munitions contain a standby power source, viz., a standby battery, to maintain a low-power operational mode of the receive data link as the munitions await for instructions specifically directed to itself. Such battery-powered implementations provide a relatively short (on the order of days) period of standby operation before the standby datalink battery needs to be replaced.

Prior art teaches methods to supply power for data link operation. U.S. Pat. No. 4,091,734, issued to Maisonneuve, et al. involves employment of fiber-optic connections to remotely located electrical apparatus to supply sufficient power for data link operation. Others might use large photovoltaic optical (sunlight) power collection arrays, to supply sufficient power for data link operation.

U.S. Pat. No. 4,091,734, issued to Redmond, et al. teaches using power from a photovoltaic cell stimulated by a visible light source to power an optical receiver datalink. Though Redmond's teaching and implementation might be used for a light-activated control function, its range is limited to 20 inches, which is insufficient for remote (i.e., longer range) light activation control applications. Redmond, et al. teach the use of a direct IR carrier modulation which utilizes a modulation of the raw IR energy, i.e., 940 manometers wavelength, for transmission of single information bits, then relying on a protocol to encode information, in Redmond's case using a pulse numbers protocol. The Redmond, et al. approach can implement ranges only up to 20 inches (1.6 ft). This is not sufficient for some intended wireless interface applications (8 ft). It is the intent of the current invention to overcome such restrictive range limitations.

The modulation method employed by Redmond cannot, with any practical scaling or extension, meet many wireless interface range requirements. In particular, practical "scaled up" version of Redmond's techniques can feasibly achieve the required virtual umbilical range for dispersed munitions in an aircraft environment activation.

OBJECTS AND SUMMARY OF THE INVENTION

It is a principal object of the present invention to eliminate the need for performing any battery installation or maintenance functions on a remote device after it leaves the factory, in order to accomplish the data link activation function.

It is another object to be able to accomplish intended control functions with a relatively low level of illumination at the receiving weapon location, relatively few light sources, simultaneously powered, and remotely located from the weapon, to provide sufficient power to many weapons at once, thereby permitting a practical implementation.

It is another object to maximize the installation cost benefits and low-maintenance attractiveness of a wireless interface data link to potential customers by removing the need for any power or data path physical connection to remote devices to establish a communications link, and to extend the maintenance free time of the data link activation system employed.

These and other objects are achieved by the wireless datalink activation system of the present invention. In its broad aspects, the system includes at least one data receiver, a low-power, photovoltaic power generation and distribution system, and a unique signal detector. The data receiver receives serial digital information from a remote optical data transmitter. The data receiver serves both activation and data/control wireless datalink functions. The low-power photovoltaic power generation and distribution system includes at least one photovoltaic panel for receiving optical power from a directed beam remote optical emission source. The power generation and distribution system also includes a power accumulation and distribution portion connected to the photovoltaic panel for accumulating power generated by the photovoltaic panel for periodically and intermittently distributing accumulated power in desired quantities. The unique signal detector is connected to the data receiver and to the power accumulation and distribution portion. It is also connectable to an electrical apparatus. The periodically and intermittently distributed power enables the unique signal detector to evaluate incoming data received from the data receiver, and upon detection of the receipt of the signal qualifying as a key, thereupon issues a command to the electrical apparatus to initiate uninterrupted data communication from the data receiver.

The present system is based on the known capabilities of current wireless virtual umbilical implementations which provide a downlink (host system to remote device) communications capability for passing prelaunch initialization data to a remote device, to wit a weapon, and available micropower device technology. The system is capable of providing a lifetime, maintenance and physical connection free means of accomplishing remote data link activation.

Redmond, et al. teach a power conditioning, or accumulation, function. Redmond, et al., however, continuously apply this power to the power accumulator device (a capacitor) and data recovery circuit. The present invention first accumulates the required power and, only when a sufficient amount has been stored, then switches the stored power to the data recovery circuitry. This technique of intermittent switched power application, allows the use of a photovoltaic power source which provides less than the amount of continuous power required for the data recovery function. This technique allows the power to be gathered over an extended period (e.g., 2 seconds), then applied over a relatively short period (e.g., 200 milliseconds). This affords a 10X improvement in available power for the data recovery circuitry, thereby permitting a proportionate reduction in the illumination intensity. Even greater reductions (e.g., 100X) of illumination power and light intensity are possible with this innovation. The present invention affords the possibility of power accumulation and control function operation at more remote (longer) ranges than Redmond's approach, making it applicable in many more potential applications.

In accordance with the principles of the present invention, a lifetime battery is permitted to be installed at the factory for PGM weapons, or other remote devices, and for the service life of the data link activation system to equal that of the shelf life of the battery installed, typically on the order of 10 years for lithium batteries employed in smart munitions.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
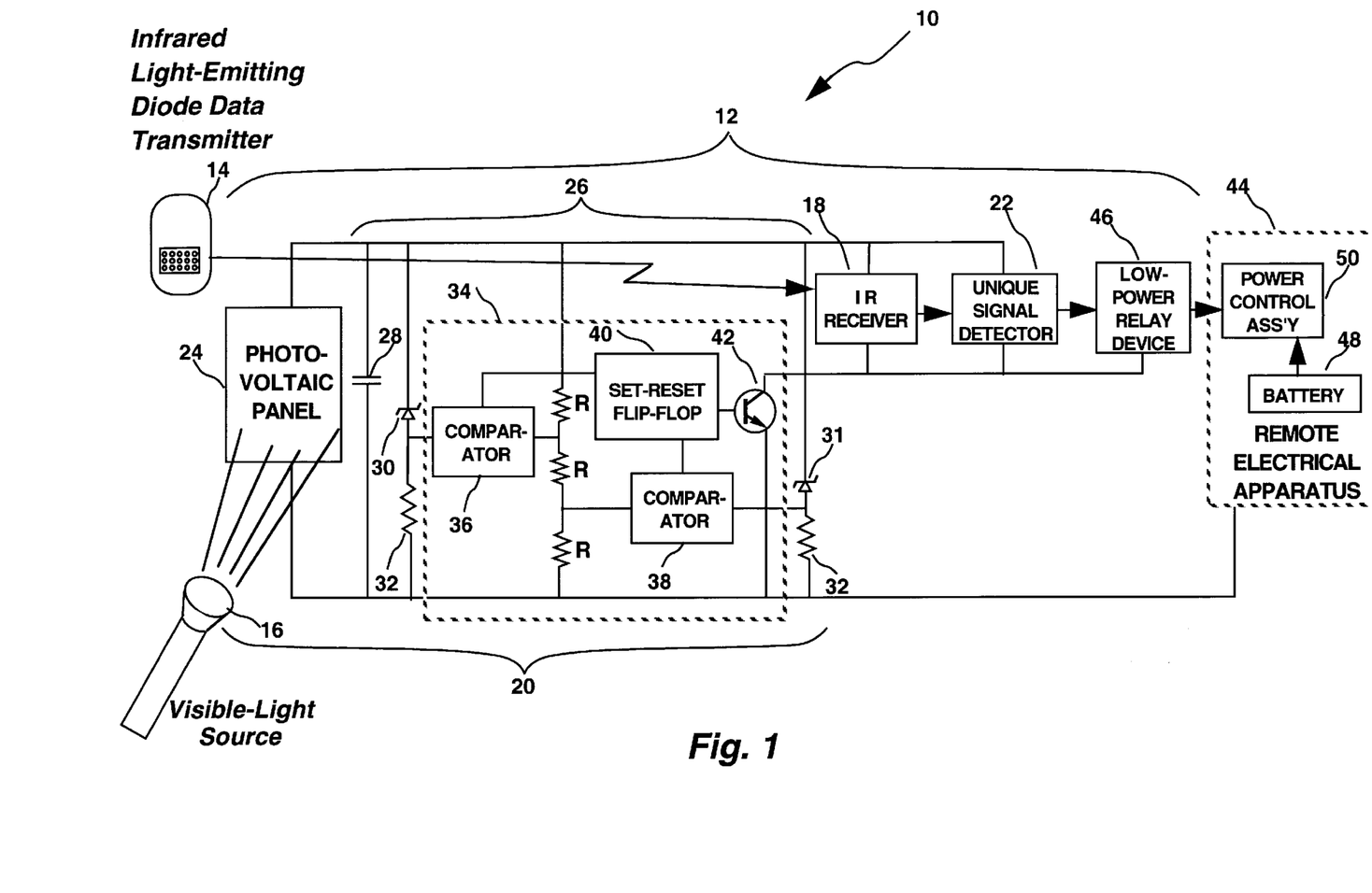
FIG. 1 is a schematic illustration of the self-powered datalink activation system of the present invention.

Referring now to the drawings and the characters of reference marked thereon, FIG. 1 illustrates the self-powered datalink activation system of the present invention, designated generally as 10. The self-powered datalink activation system 10 includes a wireless datalink activation system, designated generally as 12, a remote optical data transmitter 14 and a directed beam remote optical emission source 16.

The directed beam remote optical emission source 16 may typically be an optical light source provided by an incandescent flood lamp or a light bulb/parabolic reflector assembly. The optical energy will typically be in the visible optical spectrum.

The optical data transmitter 14 typically comprises an infrared light-emitting diode (LED) array operating with a carrier frequency compatible with a remote receiver (discussed below) of the wireless datalink activation system. The data transmitter 14 is preferably modulated with an Amplitude Shift Keyed (ASK) format in accordance with a serial bit stream.

The wireless datalink activation system 12 comprises a data receiver 18, a low power photovoltaic power generation and distribution system 20, and a unique signal detector 22. The data receiver 18 receives serial digital information from the remote optical data transmitter 14. The data receiver 18 serves both activation and data/control wireless datalink functions. The data receiver 18 will typically receive the serial digital information at a wavelength of approximately 900 to 1000 nanometers and modulated with a square wave carrier, typically in the range of 40 to 400 kilohertz. The modulation will typically be in a range of up 19.2 kilobits per second. The receiver 18 extracts and delivers, at its output, the modulated signal up to 19.2 kilobits per second.

The low-power photovoltaic power generation and distribution system 20 includes a photovoltaic panel 24 and power accumulation and distribution means 26. The photovoltaic panel 24 receives optical power from the directed beam remote optical emission source 16. The panel 24 typically comprises high efficiency photovoltaic cells sufficient to generate approximately 6 volts when illuminated. The optical power received by the panel 24 is relatively low optical power in a range of 1.0 mW to 10.0 mW.

The power accumulation and distribution means 26 is connected to the photovoltaic panel 24 for accumulating power generated by the photovoltaic panel 24 for periodically and intermittently distributing accumulated power in desired quantities. The power accumulation and distribution means 26 includes a capacitor 28, which is connected to the photovoltaic panel 24. A pair of micro-power voltage reference diode-resistor networks 30,32 and 31,32 are connected in parallel to the capacitor 28. A micro-power timer integrated circuit, designated generally by dashed lines 34 is connected in parallel to the capacitor 28 and to the networks 30,32 and 31,32.

The integrated circuit 34 is a low power version of the common "555 timer", which is widely used in combination with the digital circuits. An example of integrated circuit 34 is a "low power NE555V" or Product No. XRL555JP, distributed by Jim-Pack® Electrical Components of Belmont, Calif.

Integrated circuit 34 comprises a pair of comparators 36,38, each connected to an associated micro-power voltage reference diode-resistor networks 30,32 and 31,32. A set-reset flip-flop 40 is connected to outputs of the comparators 36,38, which allow the initiation and termination of power distribution periods. A transistor switch 42 is connected to an output of the flip-flop 40 and to the unique signal detector 22 for conducting the evaluation of incoming data.

The capacitor 28 might typically be a low leakage 1,000 microfarad capacitor rated at 6 volts. Each diode 30 and 31 may be, for example, 1.8 volt and 2.7 volt micro-power voltage reference diodes. The voltage references selected by the reference diode may be such as to achieve the desired initiation and termination voltages of the power distribution. They should provide initiation voltages and termination voltages within the operating ranges of the IR receiver 18 and the unique signal detector 22, nominally 5.5 volts to 4.0 volts.

Figure 6:
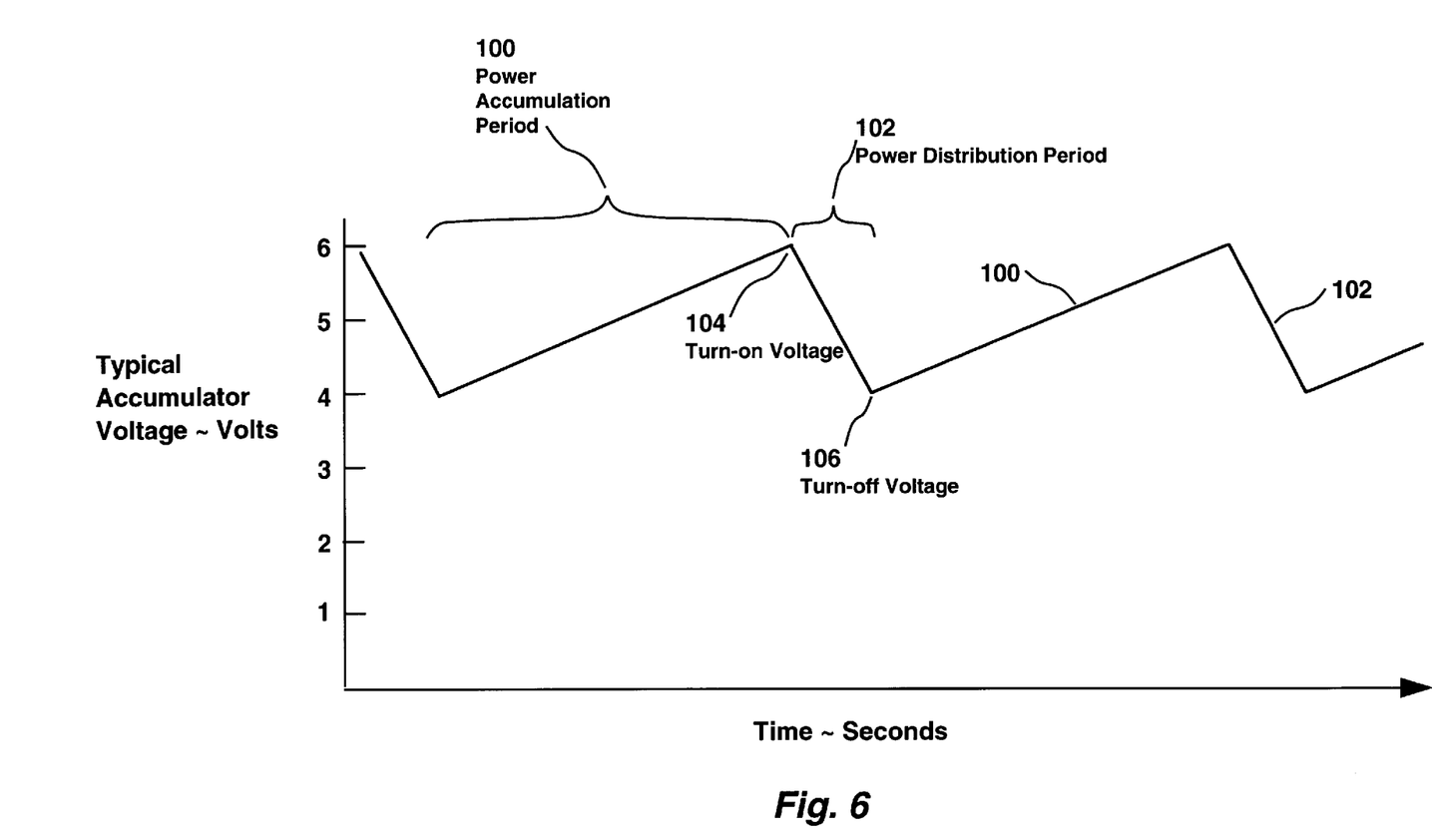
FIG. 6 is a diagram illustrating a typical voltage time history within the power accumulation and distribution means of the self-powered data link activation system shown in FIG. 1.

The range of voltage swing during the power accumulation and distribution periods is governed by the Zener voltage ratings of the micropower Zener diodes 30 and 31, utilized in the power accumulation and distribution circuit 26, in FIG. 1. The diode governing the turn-on voltage point 104, of the power distribution period 102 in FIG. 6, is Zener diode labeled 30. Similarly, the diode governing the turn-off voltage point, 106, of the power distribution period 102 in FIG. 6, is Zener diode labeled 31. The desired turn-on and turn-off voltages may be selected by appropriate voltage selections for these diode installations. Also, multiple lower-voltage diodes connected in series can be substituted for either diode 30 or 31 to build up a network of specific voltage to achieve a desired voltage switching point. The following relationships specify the Zener diode (or series-connected diode network) voltages required to achieve desired power distribution turn-on and turn-off voltages:

$$V_{Z,On} = \frac{1}{3} \cdot V_{Out,On}$$

$$V_{Z,Off} = \frac{2}{3} \cdot V_{Out,Off}$$

Where $V_{Z,On}$ is the voltage rating for diode or network 30, $V_{Z,Off}$ is the voltage rating for diode or network 31, $V_{Out,On}$ is the desired turn-on voltage 104, and $V_{Out,Off}$ is the desired turn-off voltage 106. For example, for turn-on and turn-off voltages of 6 and 4 volts, respectively, ratings of 2.0 and 2.66 volts are required for Zener diodes 30 and 31, respectively.

The resistors 32 are selected to provide the minimum current necessary for the voltage reference diodes 30 to generate their proper working voltage reference. The resistor values are selected to provide diode activation currents on the order of 50 micro amperes.

The unique signal detector 22 is connected to the data receiver 18, to the power accumulation and distribution means 26 and to an electrical apparatus 44 (via a final switching device or low power relay device 46), such that the periodically and intermittently distributed power enables the unique signal detector 22 to evaluate incoming data received from the data receiver 18. Upon detection of the receipt of a signal qualifying as a key, a command is issued to the electrical apparatus 44 to initiate uninterrupted data communications from the data receiver 18. The low-power relay device 46 is connected between the unique signal detector 22 and the electrical apparatus 44 for activating the electrical apparatus 44. The characteristics of the low-power relay device 46 are such that when in an off condition, extremely low leakage current is drawn from a battery 48 within the electrical apparatus 44. A power control assembly 50 of the electrical apparatus 44 regulates the power application function in the remote electrical apparatus 44. A low leakage switch characteristic permits the utilization of a lifetime battery 48 within the remote electrical apparatus 44 without the premature discharge of the battery 48. Another characteristic of the low-power relay device 46 is that it operates on the low currents available from the unique signal detector 22 output.

The unique signal used as the enabling key may be as simple as a continuous square wave pulse train of a specific frequency, or a more complicated series of unique pulses. In its simplest implementation, the unique signal detector 22 is implemented as a tone detector for the constant frequency square wave. For this purpose, a tone decoder phase locked loop integrated circuit may be used, such as distributed by Jim-Pack® Electronic Components having Product No. LM567VJP.

Figure 2:
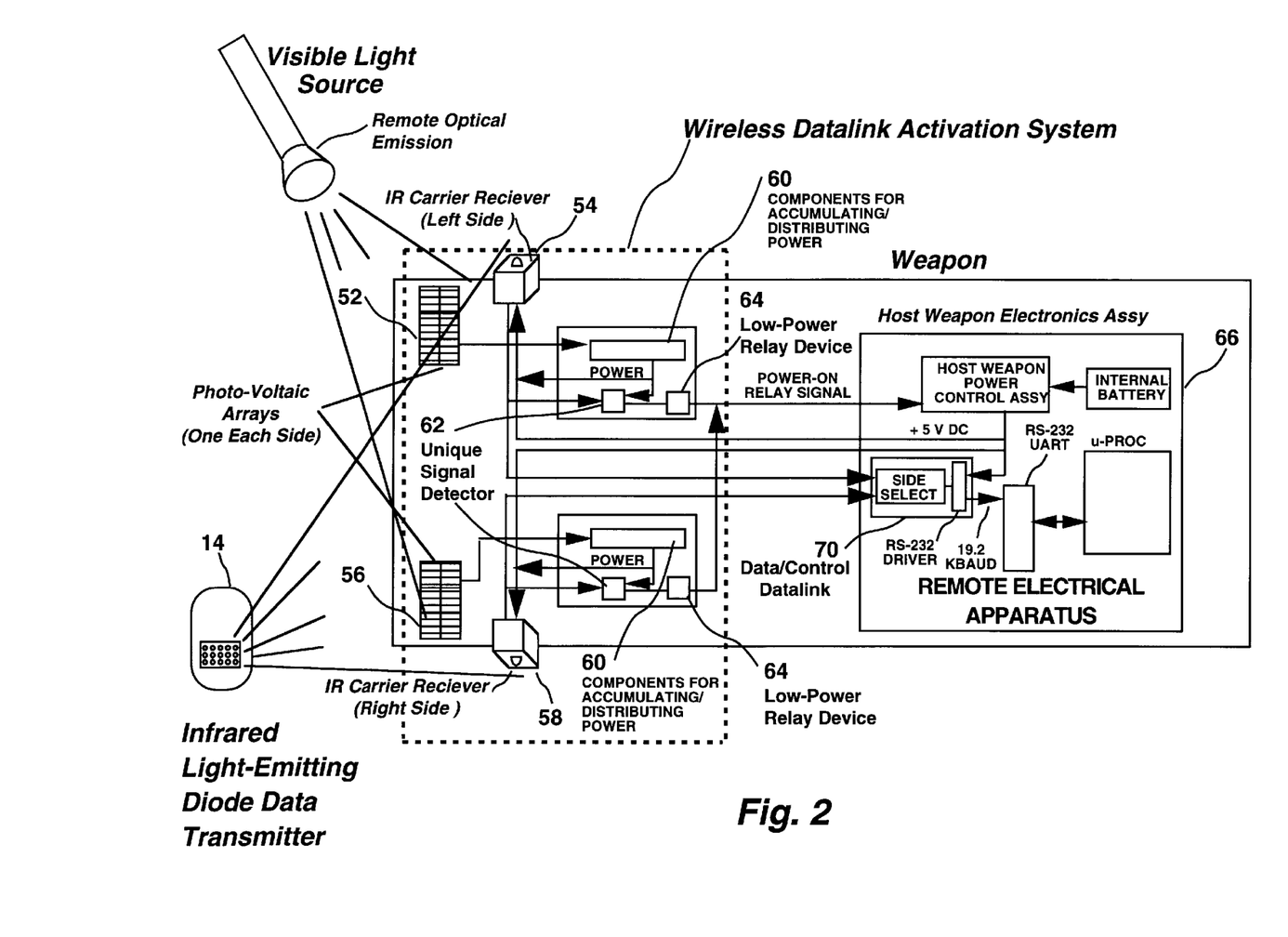
FIG. 2 is a schematic illustration of a smart munitions application of the self-powered datalink activation system of the present invention.

In a typical weapon application, data communication may come from either the right or the left hand direction for line of sight communications between the host platform and munitions. To retain loading flexibility for munitions, it is, therefore, desirable to implement communications capabilities from either direction. Referring now to FIG. 2, such a typical weapon application is illustrated. A left side photovoltaic optical power panel 52 and infrared data receiver 54, as well as a right side panel 56 and receiver 58 are operated in parallel, with the low power relay devices of each connected in parallel to the power control assembly 50 of FIG. 1 of the remote electrical apparatus 66, in this case, a weapon. Once activated, the left or right data receivers 54, 58 present their data stream to the primary communications channel 70 for the weapon 66.

Figure 3:
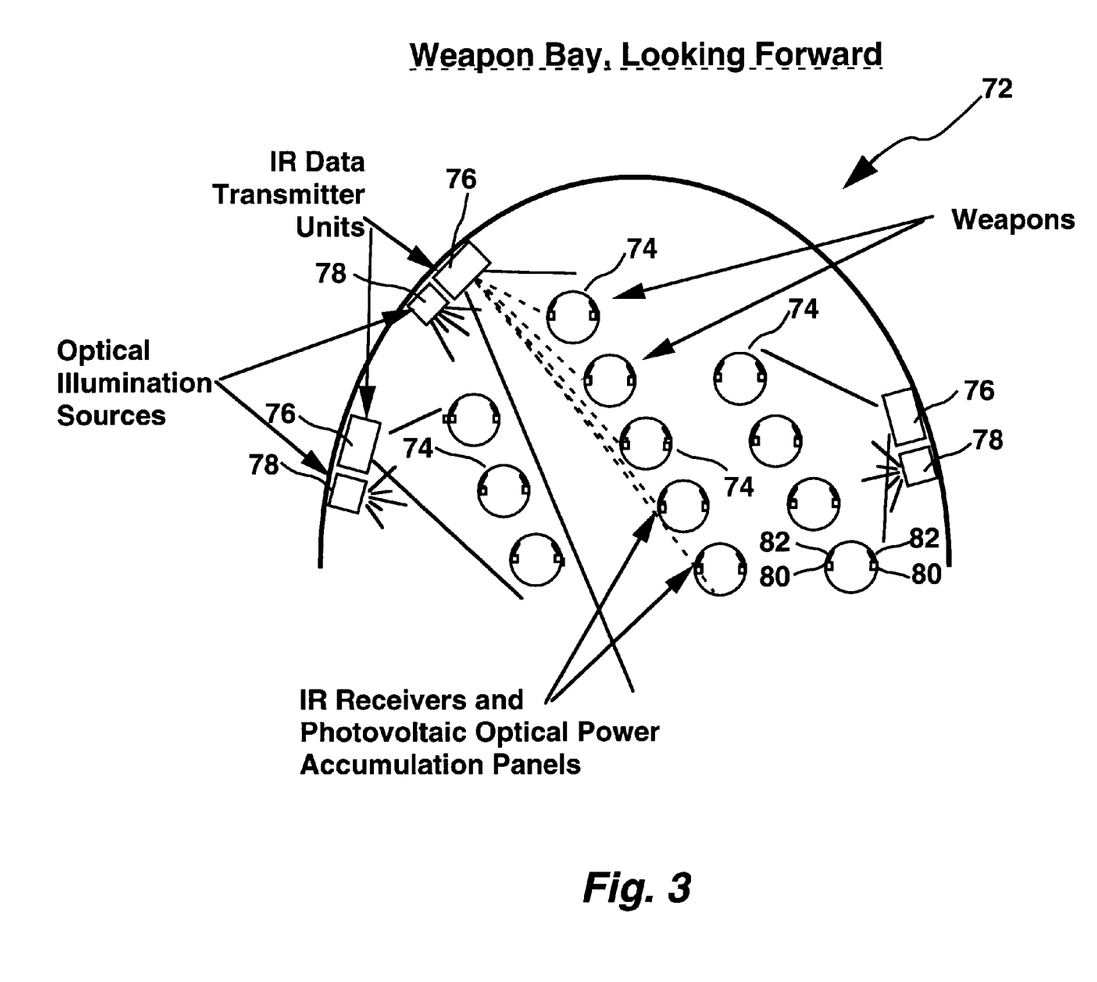
FIG. 3 is a diagram illustrating the geometric layout of a weapon bay incorporating the system of the present invention.

Referring now to FIG. 3, a weapon bay, designated generally as 72, is illustrated. In a typical application, three rows of weapons 74 make up a typical loading geometry. One transmitter unit 76 is designed to serve each row of weapons 74. The desire for datalink communication and activation from either side of the weapon is apparent from this figure. Optical power light sources 78 are co-located next to each transmitter unit 76. Dual IR data receivers 80 are depicted on each weapon 74. Photovoltaic panels 82 are shown adjacent to the IR data receivers 80.

Figure 4:
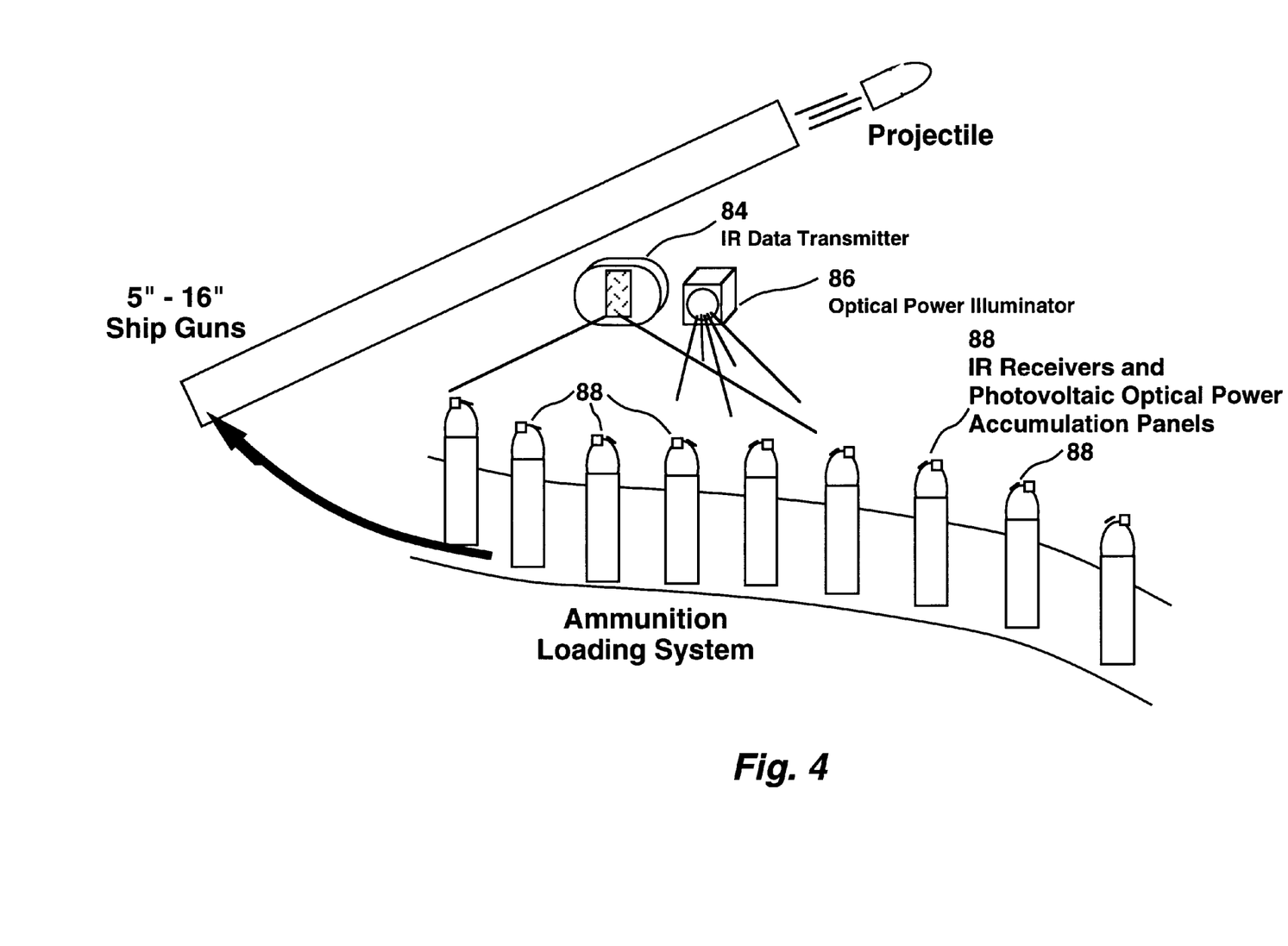
FIG. 4 is a diagram illustrating the geometric layout of a conveyer assembly for breach loaded munitions, incorporating the present system.

FIG. 4 illustrates the self-powered datalink activation system employed with breach-loaded precision guided munitions. Communications with munitions are initiated as the munitions approach the breach, often on a conveyer system. Shown are the infrared data communication source 84, and the optical power illuminator 86. The wireless datalink activation system 88, is shown installed in the head or collar of the projectile. As the munitions approach the breach, the self-powered datalink activation system first activates the data link. Thereafter, the IR data transmitter relays the necessary initialization data.

Figure 5:
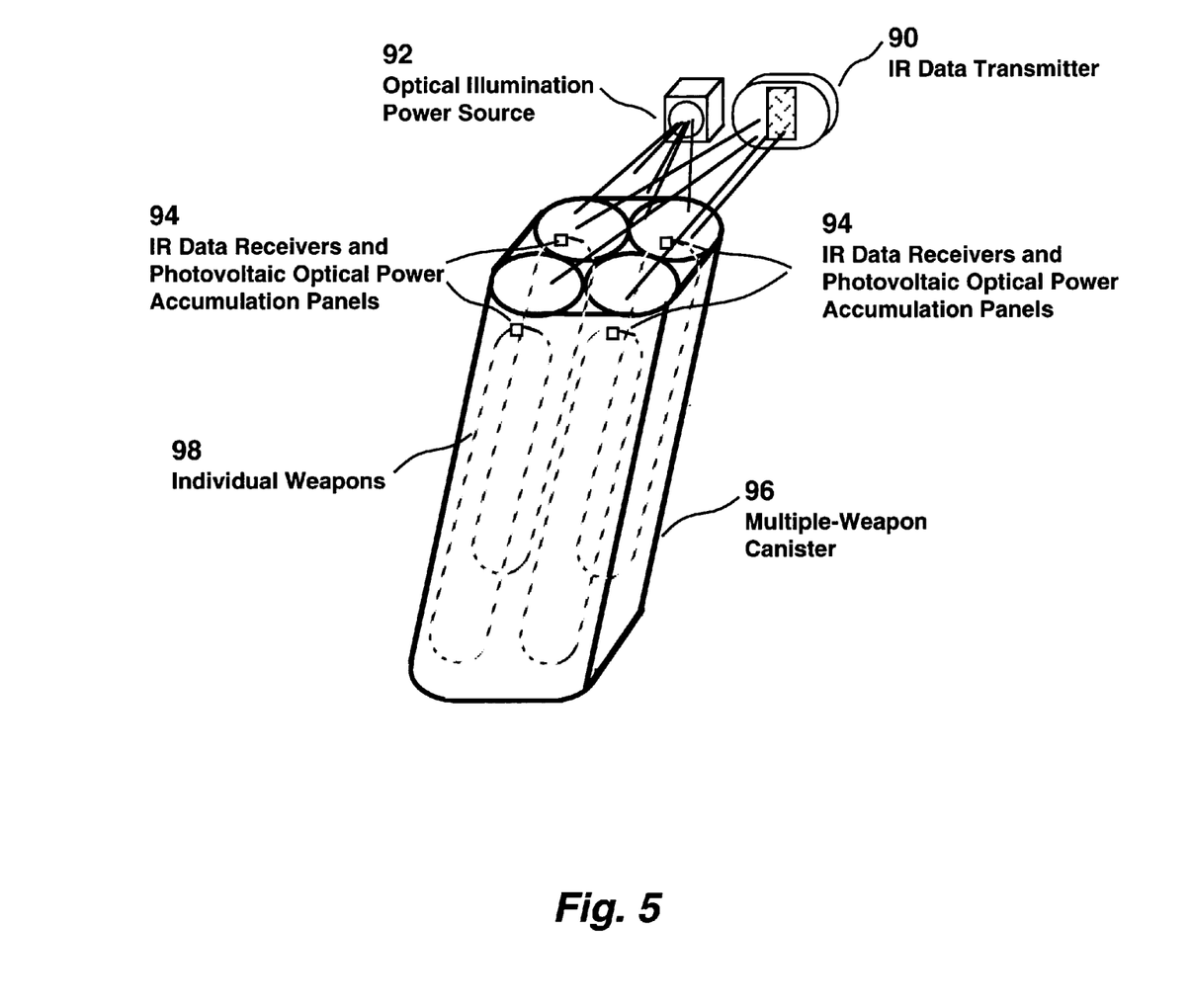
FIG. 5 is a diagram illustrating the geometric layout of a canister launch system incorporating the present system.

FIG. 5 illustrates the self-powered datalink activation system employed with a multiple precision guided munitions canister. Individual munitions 98, are shown dotted lined, within the canister assembly 96. The IR data transmitter 90, and optical illumination power source 92, are positioned within direct, or reflected, proximity to the head of individual munitions, where the wireless datalink activation system surface components, 94 are located.

FIG. 6 illustrates the periodic nature of the power accumulation and distribution phases of the self-powered datalink activation system. When power delivered from the self-powered datalink activation system photovoltaic optical power accumulation panel, 24, of FIG. 1, is insufficient to continuously power the IR data receiver 18, and unique signal detector 22 components, then power is accumulated for a period 100, as shown in FIG. 6, without passing any on to the IR data receiver 18, and unique signal detector 22 components. Then, when sufficient voltage is achieved across the storage capacitor, 28, power is released, or distributed, as shown in FIG. 6 to the IR data receiver 18, and unique signal detector 22, components for short bursts of time 102, sufficient to determine if a unique signal is present from the unique signal detector 22.

Datalink activation can be scaled to operate at whatever ranges necessary by providing the same optical power illumination intensity as described herein for the preferred embodiment implementations (which easily operate at nominal ranges up to approximately 10 ft) with a four square inch photovoltaic power accumulation panel. Equivalent optical illumination intensity can be obtained at longer ranges by the use of a focused illuminator reflector assembly at the illumination source and directed at the remote device, or by increasing illuminator power. Alternatively, the size of the power accumulation panel may be increased proportionally, if the size and form factor of the remote object permit, to accomplish operation at longer ranges.

Although the present invention has been discussed above, particularly with respect to weapons applications, as noted above, the principles of this invention are broader than this particular application. Other applications include any situation where it is necessary to establish communications with a self-powered remote object which does not have convenient continual access to an external power source and for which periodic replacement of a datalink battery would be undesirable. Mobile robotic devices would meet such criteria, especially those operating in locations difficult or undesirable to access.

Difficult or undesirable to access locations could include space borne applications where the remote device may be in the vacuum of space for extended periods of time, yet near enough (tens to hundreds of feet) to a controlling manned or unmanned space vehicle for datalink operation.

Other undesirable-to-access applications which would also clearly benefit from this invention include remote controlled robotics operating in hazardous materials, radioactive, or clean room environments.

Obviously, many modifications and variations of the present invention are possible in light of the above teachings. For example, the IR data transmitter and receiver may be substituted with RF components providing equivalent functionality. It is therefore to be understood that, within the scope of the appended claims, the invention may be practiced otherwise than as specifically described. What is claimed and desired to be secured by Letters Patent of the United States is:

What is claimed is:

1. A wireless datalink activation system for remote activation of an electrical apparatus using a remote optical data transmitter and a directed beam remote optical emission source, said wireless datalink activation system comprising:
    a) at least one data receiver for receiving serial digital information from a remote optical data transmitter, said data receiver serving both activation and data/control wireless datalink functions;
    b) a low-power photovoltaic power generation and distribution system, comprising:
        at least one photovoltaic panel for receiving optical power from a directed beam remote optical emission source; and
        power accumulation and distribution means, comprising a micro-power timer integrated circuit, connected to said at least one photovoltaic panel for accumulating power generated by said at least one photovoltaic panel for periodically and intermittently distributing accumulated power in desired quantities; and
    c) a unique signal detector connected to said at least one data receiver and to said power accumulation and distribution means, and being connectable to an electrical apparatus, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

2. The wireless datalink activation system of claim 1, wherein said unique signal detector comprises a tone detector circuit.

3. The wireless datalink activation system of claim 1, wherein said power accumulation and releasing means further comprises:
    a capacitor connected to said photovoltaic panel; and
    a pair of micro-power voltage reference diode-resister networks connected in parallel to said capacitor.

4. The wireless datalink activation system of claim 3, wherein said micro-power timer integrated circuit is connected in parallel to said capacitor.

5. The wireless datalink activation system of claim 4, wherein said micro-power timer integrated circuit comprises:
    a) a pair of comparators, each connected to an associated micro-power voltage reference diode-resistor network;
    b) a set-reset flip-flop connected to outputs of said comparators, which enables the initiation and termination of power distribution periods; and
    c) a transistor switch connected to an output of said flip-flop and to said unique signal detector for activating said evaluation of incoming data.

6. The wireless datalink activation system of claim 5, further comprising a low power relay device connected between said unique signal detector and said electrical apparatus for activating said electrical apparatus.

7. The wireless datalink activation system of claim 1, further including said electrical apparatus comprising smart munitions positioned in a pre-launch configuration.

8. The wireless datalink activation system of claim 7, wherein said at least one data receiver comprises two data receivers.

9. The wireless datalink activation system of claim 8, wherein said pre-launch configuration comprises a weapons bay.

10. The wireless datalink activation system of claim 8, wherein said pre-launch configuration comprises a launch canister.

11. The wireless datalink activation system of claim 8, wherein said pre-launch configuration comprises a weapon loading conveyer assembly for breach-loaded munitions.

12. The wireless datalink activation system of claim 8, wherein said optical power received by said at least one photovoltaic panel comprises relatively low optical power in a range of 1.0 mW–10.0 mW.

13. A wireless datalink activation system for remote activation of an electrical apparatus using a remote optical data transmitter and a directed beam remote optical emission source, said wireless datalink activation system comprising:
    a) at least one data receiver for receiving serial digital information from a remote optical data transmitter, said data receiver serving both activation and data/control wireless datalink functions;
    b) a low-power photovoltaic power generation and distribution system comprising:
        at least one photovoltaic panel for receiving optical power from a directed beam remote optical emission source; and
        power accumulation and distribution means connected to said at least one photovoltaic panel for accumulating power generated by said at least one photovoltaic panel for periodically and intermittently distributing accumulated power in desired quantities, said power accumulation and distribution means, comprising:
            i) a micro-power timer integrated circuit;
            ii) a capacitor connected to said photovoltaic panel; and iii) a pair of micro-power voltage reference diode-resister networks connected in parallel to said capacitor and to said micro-power timer integrated circuit; and c) a unique signal detector connected to said at least one data receiver and to said power accumulation and distribution means, and being connectable to an electrical apparatus, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

14. A self-powered datalink activation system for remote activation of an electrical apparatus, comprising:

a) a remote optical data transmitter;

b) a directed beam remote optical emission source; and c) a wireless datalink activation system, comprising:
  i) at least one data receiver for receiving serial digital information from said remote optical data transmitter, said data receiver serving both activation and data/control wireless datalink functions;
  ii) a low-power photovoltaic power generation and distribution system, comprising:
    at least one photovoltaic panel for receiving optical power from a directed beam remote optical emission source; and
    power accumulation and distribution means, comprising a micro-power timer integrated circuit, connected to said at least one photovoltaic panel for accumulating power generated by said at least one photovoltaic panel for periodically and intermittently distributing accumulated power in desired quantities; and
  iii) a unique signal detector connected to said at least one data receiver and to said power accumulation and distribution means, and being connectable to an electrical apparatus, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

15. A wireless datalink activation system for remote activation of smart munitions positioned in a pre-launch configuration, said wireless datalink activation using a remote optical data transmitter and a directed beam remote optical emission source, said wireless datalink activation system comprising:

a) at least one data receiver for receiving serial digital information from a remote optical data transmitter, said data receiver serving both activation and data/control wireless datalink functions;

b) a low-power photovoltaic power generation and distribution system, comprising:
  at least one photovoltaic panel for receiving optical power from a directed beam remote optical emission source; and
  power accumulation and distribution means, comprising a micro-power timer integrated circuit, connected to said at least one photovoltaic panel for accumulating power generated by said at least one photovoltaic panel for periodically and intermittently distributing accumulated power in desired quantities; and c) a unique signal detector connected to said at least one data receiver and to said power accumulation and distribution means, and being connectable to smart munitions positioned in a pre-launch configuration, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

* * * * *